Nov. 18, 1969　　A. GOLOFF ET AL　　3,478,411
FRICTION WELDING STELLITE FACINGS TO VALVE SEATS
Filed Oct. 9, 1967　　3 Sheets-Sheet 1

INVENTORS
ALEXANDER GOLOFF
RICHARD E. HAUTALA
CLAUDE F. WHITE
BY
ATTORNEYS

Nov. 18, 1969    A. GOLOFF ET AL    3,478,411
FRICTION WELDING STELLITE FACINGS TO VALVE SEATS
Filed Oct. 9, 1967    3 Sheets-Sheet 3
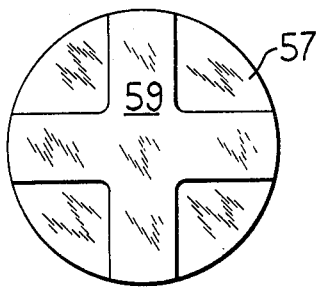
Fig.-4-
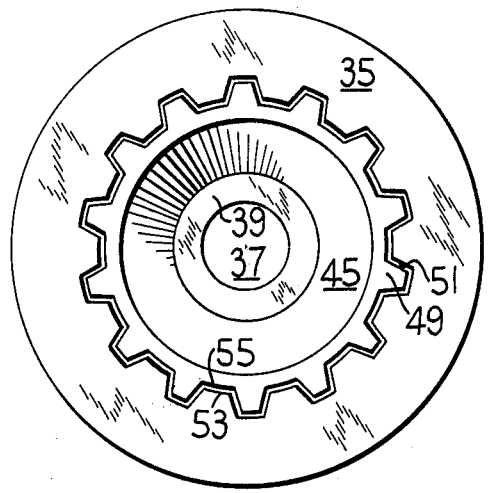
Fig.-3-
INVENTORS
ALEXANDER GOLOFF
RICHARD E. HAUTALA
CLAUDE F. WHITE
BY
ATTORNEYS

United States Patent Office 3,478,411
Patented Nov. 18, 1969

3,478,411
FRICTION WELDING STELLITE FACINGS TO VALVE SEATS
Alexander Goloff, East Peoria, Richard E. Hautala, Peoria, and Claude F. White, Creve Coeur, Ill., assignors to Caterpillar Tractor Co., Peoria, Ill., a corporation of California
Filed Oct. 9, 1967, Ser. No. 673,553
Int. Cl. B23k 27/00; B21k 1/20
U.S. Cl. 29—470.3                                3 Claims

ABSTRACT OF THE DISCLOSURE

A valve assembly for an internal combustion engine wherein a seating surface of said valve assembly has a thin disc of Stellite facing material friction welded thereto.

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature thereupon the relative rotation subsides.

It is also to be understood that the invention is specifically applicable to the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

Stellite faced valves are desirable because of their high temperature properties. At the present time, however, the most successful method for joining the Stellite seat facing material to the valve seats is by a "puddling" method. This technique involves the rotating of the valve while a torch directed toward the seat face melts a rod of Stellite onto the pre-heated valve. This technique requires considerable operator skill and time and is, therefore, quite costly.

It is the principal object of the present invention to provide a valve assembly having a Stellite facing material joined to the valve seat by friction welding. Friction welding of the Stellite to the valve seat eliminates the disadvantages connected with operator judgment in the prior art "puddling" method and moreover, substantially shortens the weld time per valve.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 3 is a cross-sectional view taken on the line III—III of FIG. 2; and

FIG. 4 is a cross-sectional view taken on the line IV—IV of FIG. 2.

DESCRIPTION OF THE PREFERRED EMBODIMENT

Figure 1:
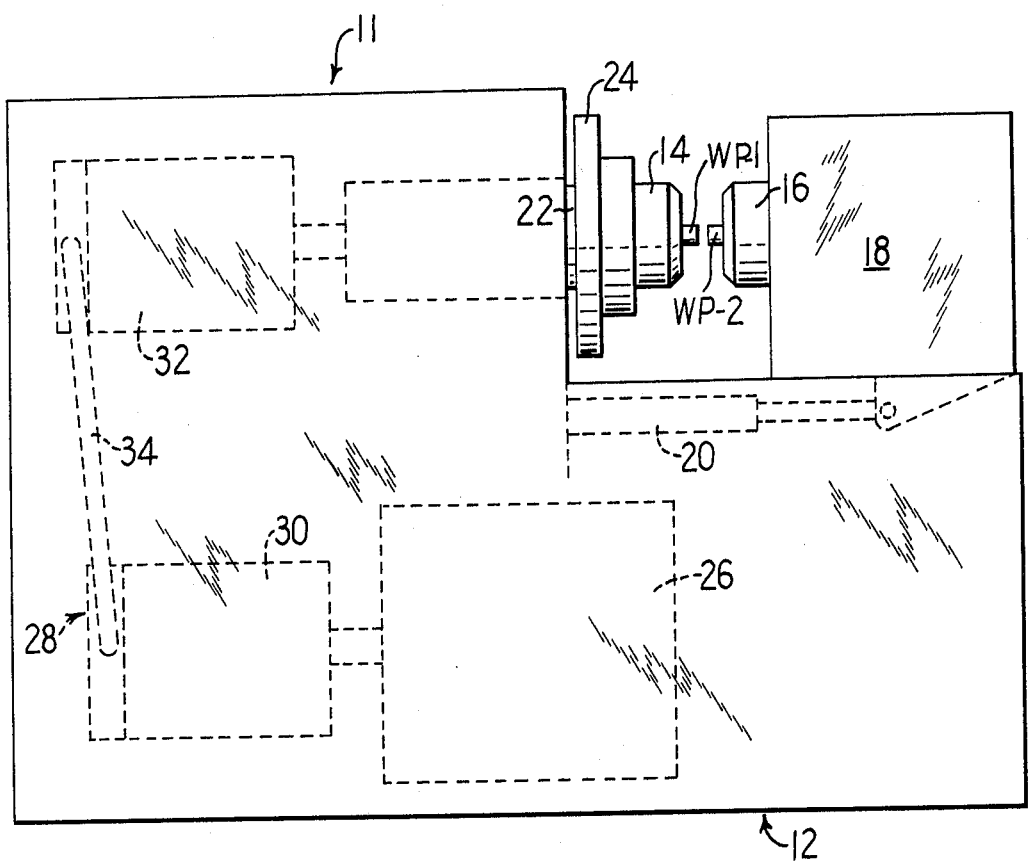
FIG. 1 is a side elevation illustrating one embodiment of a friction welding machine which may be used to practice the method of the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2 are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Patent No. 3,273,233 and as described in further detail below.

A welding operation to join a first workpiece such as a Stellite facing material to a second workpiece such as a valve seat, can be performed by operating the machine in the following manner. One of the weld pieces WP-1 is firmly clamped in the rotatable chuck 14 located on the spindle 22. The other weld piece WP-2 is firmly clamped in the nonrotatable chuck 16 which is located on the tailstock portion 18 of the machine. Upon actuation of the motor 26, the flywheel and workpiece WP-1 are accelerated to a predetermined velocity.

Once the predetermined velocity has been attained, the motor 26 is disconnected or shutdown and the ram mechanism 20 is actuated to move tailstock portion 18 and workpiece WP-2 into contact with the rapidly rotating workpiece WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

Figure 2:
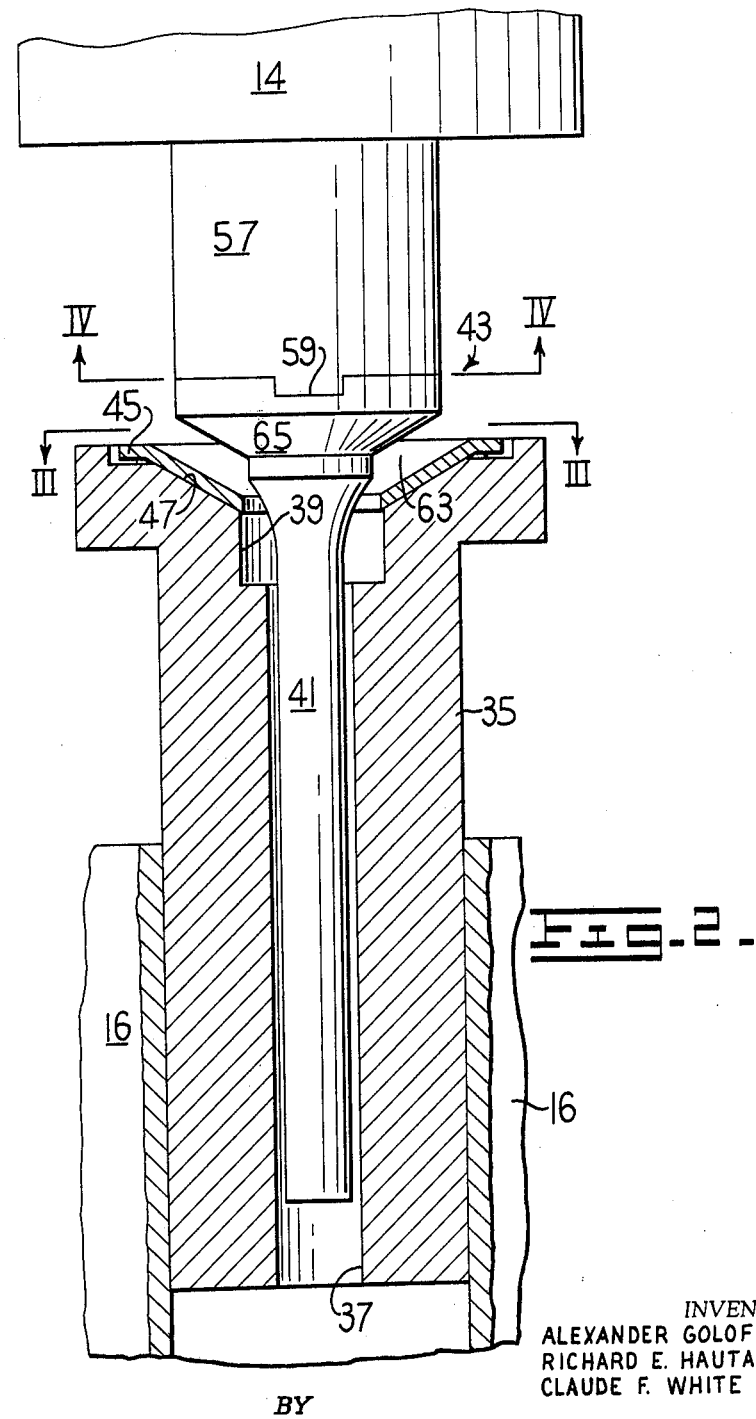
FIG. 2 is a longitudinal view, partially in section, illustrating one type of apparatus which may be utilized to manufacture a valve assembly in accordance with the invention.

FIG. 2 illustrates two holding fixtures wherein the valve and Stellite facing material are held in place in preparation for making a friction weld therebetween. The nonrotating chuck 16 is clamped about a Stellite disc holding fixture 35 which is shown in section to illustrate how it is machined with a hole 37 and counterbore at 39 to accommodate the stem 41 of a valve 43. A preformed Stellite disc 45 rests on a tapered area 47 of the fixture 35.

As best shown in FIG. 3, the Stellite disc 45 is provided on its outer circumference with splines 49 which mesh with keyways or slots 51 machined in the fixture 35. The fixture 35 is also provided with splines 53 which correspondingly mesh with keyways or slots 55 machined into the Stellite disc 45. The combination of splines and keyways between the Stellite disc 45 and fixture 35 functions to hold the disc stationary during the weld cycle.

Referring now to FIG. 4 in conjunction with FIG. 2, it can be observed that a valve holding fixture 57 holds the valve 43 in driving relation therewith. The fixture 57 is provided with a cross-like protuberance or projection 59 which matingly fits inside a cross-like slot 61 machined in the head portion of the valve 43. In this manner the valve may be held against slippage and rapidly rotated by the cross-like pilot projection formed on the end of the valve holding fixture 57.

A friction weld between the area 63 of the Stellite disc and the seat portion 65 of the valve 43 is effected in the following manner. The Stellite disc 45 is inserted into the holding fixture 35 which is firmly chucked or attached to the nonrotatable portion 16 of the friction welding machine. The valve 43 is then attached to the holding fixture 57 which is firmly chucked or attached to the rotatable portion 14 of the friction welding machine. The two portions of the machine are then brought into close proximity by operation of the ram 20 so that the valve stem 41 is inserted into the hole 37 of the fixture 35. The rotatable portion 14 of the machine is then accelerated to a predetermined velocity at which time the two fixtures 57 and 35 are forced together under axial pressure so that the valve 43 and Stellite disc 45 come together under a predetermined pressure in the areas denoted at 63 and 65. Friction between these two surfaces causes heating which continues until a forging temperature is reached at which time upsetting of the materials occurs and the weld is completed as the rotating members come to rest. The pressure is then released, the fixtures moved apart, and the weld valve assembly is removed. Subsequent operations may be performed to remove the excess disc and valve material which has been extruded from the weld area and the valve may then be final machined into a finished part.

The following approximate parameters have been utilized to successfully weld Stellite facings to valve seats including high alloy valve seats such as Silcrome valve seats: surface velocity—600 to 1500 feet per minute; axial pressure—45,000 to 75,000 pounds per square inch; input energy—25,000 to 65,000 foot-pounds per square inch.

We claim:
1. A method of friction welding a first workpiece of Stellite facing material to a second workpiece comprising a valve seat, said method comprising the steps of, effecting relative rotation of the workpieces in a surface velocity range of from approximately 600 to 1500 feet per minute, forcing the workpieces into frictional engagement at their common interface under a predetermined axially applied pressure of from approximately 45,000 to 75,000 pounds per square inch, and effecting an energy transfer at the interface in a range of from approximately 25,000 to 65,000 foot-pounds per square inch, which concentrates heat at the interface until a bond is formed and all the input energy is expended.

2. A method as set forth in claim 1 wherein one of said workpieces is operatively associated with a rotating mass which mass stores the requisite amount of input energy to be released at the weld interface.

3. A method as set forth in claim 1 wherein said Stellite facing material comprises a thin annular disc which is provided at its outer diameter with a plurality of splines and keyways which are constructed to mesh with similar splines and keyways formed on a special fixture which fixture securely holds and supports the disc against rotation during the bonding cycle, and wherein said valve seat comprises a portion of a valve head, said valve head being further provided with a generally cross-shaped slot which is adapted to mate with a mating cross-shaped protuberance which securely holds and drivingly rotates said valve during a bonding cycle.

References Cited
UNITED STATES PATENTS

| | | | |
|---|---|---|---|
| 2,358,090 | 9/1944 | Longoria | 251—368 |
| 2,514,532 | 7/1950 | Allen et al. | 251—368 |
| 3,134,169 | 5/1964 | Hollander et al. | 29—470.3 |
| 3,235,162 | 2/1966 | Hollander | 29—470.3 |
| 3,323,203 | 6/1967 | Hollander et al. | 29—470.3 |
| 3,346,947 | 10/1967 | Hollander | 29—470.3 |
| 3,372,463 | 3/1968 | Cheng | 29—470.3 |

FOREIGN PATENTS

| | | |
|---|---|---|
| 1,018,412 | 1/1966 | Great Britain. |

JOHN F. CAMPBELL, Primary Examiner

U.S. Cl. X.R.
29—156.7; 228—2